United States Patent [19]

Rousseau

[11] 4,176,523

[45] Dec. 4, 1979

[54] ADSORPTION AIR CONDITIONER

[75] Inventor: Jean L. I. Rousseau, Redondo Beach, Calif.

[73] Assignee: The Garrett Corporation, Los Angeles, Calif.

[21] Appl. No.: 879,014

[22] Filed: Feb. 17, 1978

[51] Int. Cl.² .................................... F25B 27/00
[52] U.S. Cl. ........................... 62/2; 62/271; 165/7
[58] Field of Search ............... 62/2, 271, 309; 237/1 A; 165/7

[56] References Cited

U.S. PATENT DOCUMENTS

| | | | |
|---|---|---|---|
| 2,926,502 | 3/1960 | Munters et al. | 62/271 X |
| 3,844,737 | 10/1974 | Macriss et al. | 62/271 X |
| 4,121,428 | 10/1978 | Glenn et al. | 62/2 |

Primary Examiner—William E. Wayner
Attorney, Agent, or Firm—Joel D. Talcott; Albert J. Miller

[57] ABSTRACT

A solar powered air conditioner using the adsorption process is constructed with its components in a nested cylindrical array for compactness and ease of operation.

36 Claims, 7 Drawing Figures ns and, The invention described herein was made in the performance of work under NASA Contract No. NAS8-30758 and is subject to the provisions of section 305 of the National Aeronautics and Space Act of 1958 (72 Stat. 435; 42 USC 2457).

This invention relates to air conditioning systems and, more particularly, to a solar powered air conditioning system utilizing the adsorption process.

During recent years, substantial effort has been directed toward energy reduction. This has led to the development of systems, such as in the field of air conditioning, which operate at significantly reduced energy levels. Some of these systems have utilized solar energy in an attempt to limit the use of fossil and nuclear fuels. Significant energy savings may be accomplished if solar energy can be applied to air conditioning inasmuch as the use of air conditioning usually coincides with periods of significant exterior heating resulting from a high incidence of solar energy.

One type of system which has been proposed utilizes a desiccant bed for adsorbing moisture from air which is withdrawn from the residence to be cooled. This air is then cooled in a heat exchanger and further cooled through the vaporization of water therein and returned as supply air to the residence for cooling. The utilization of solar energy in this process is in the removal of moisture for reactivation of the desiccant bed.

A drawback with such systems is that both the desiccant bed and heat exchanger must be of substantial size. For example, a typical unit may use a rotary bed and regenerator having a diameter of about 7 ft. Containment and utilization of such structure would present substantial space problems, particularly if it were desired to use such a system for cooling a residence.

In accordance with this invention, a solar powered air conditioner using the adsorption process is constructed in a manner which permits containment in a relatively small structure. The desiccant bed and rotary heat exchanger are constructed as nested cylinders. Also positioned in the cylindrical array are additional heaters and recuperators which may be required in conjunction with these units. Thus, substantially all of the components of an air conditioning package may be contained in a relatively compact structure. Suitable ducting permits great variety in the air conditioning cycles which may be provided by such a system.

The advantages of this invention will be more readily apparent when the following specification is read in conjunction with the appended drawings, wherein.

Figure 1:
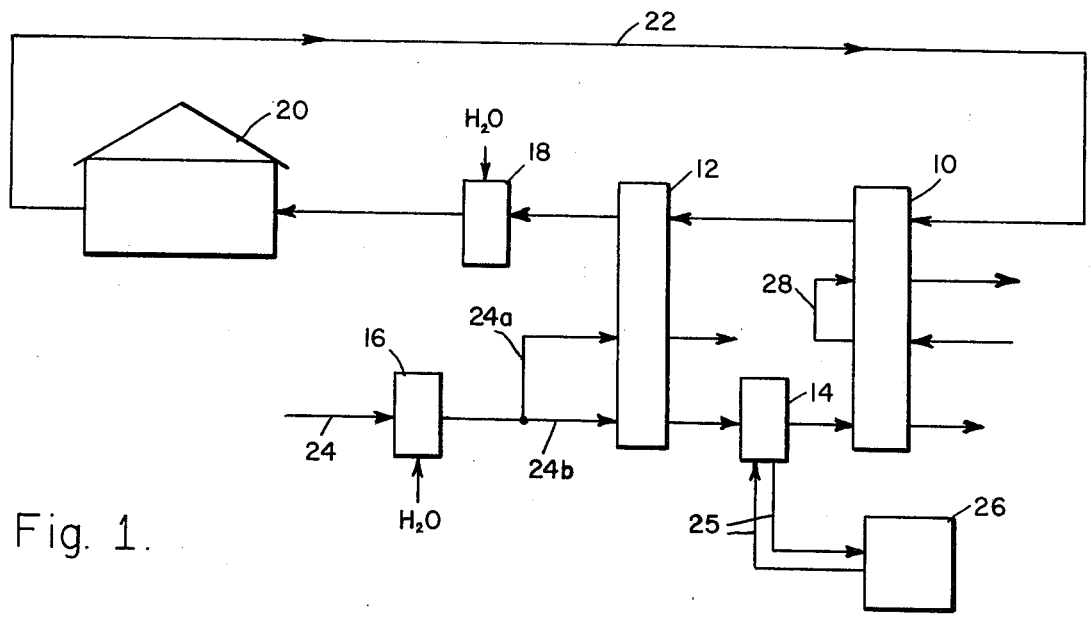
FIG. 1 is a schematic diagram of an air conditioning scheme utilizing the present invention.
Figure 2:
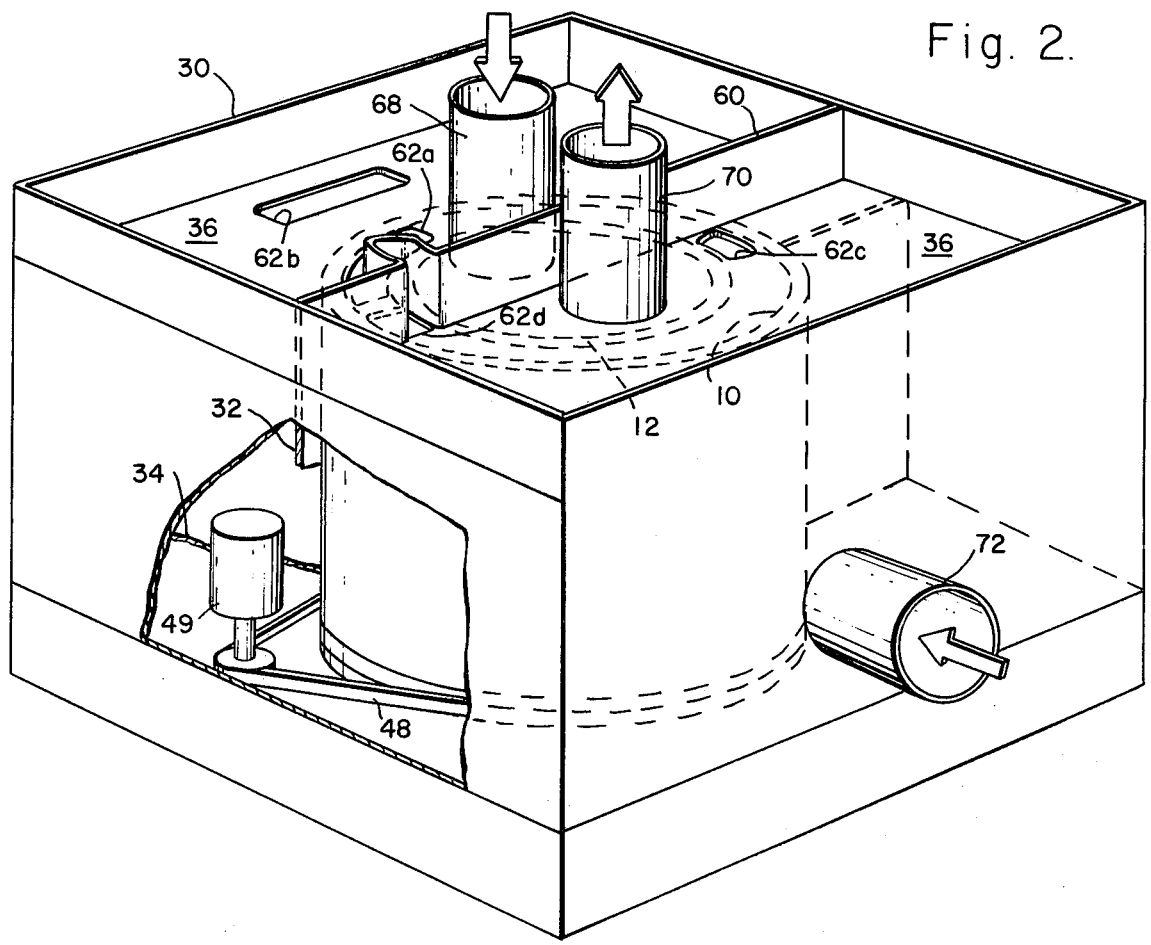
FIG. 2 is an isometric view of a compact structure incorporating components of the air conditioning system of FIG. 1 with a cover plate removed.
Figure 3:
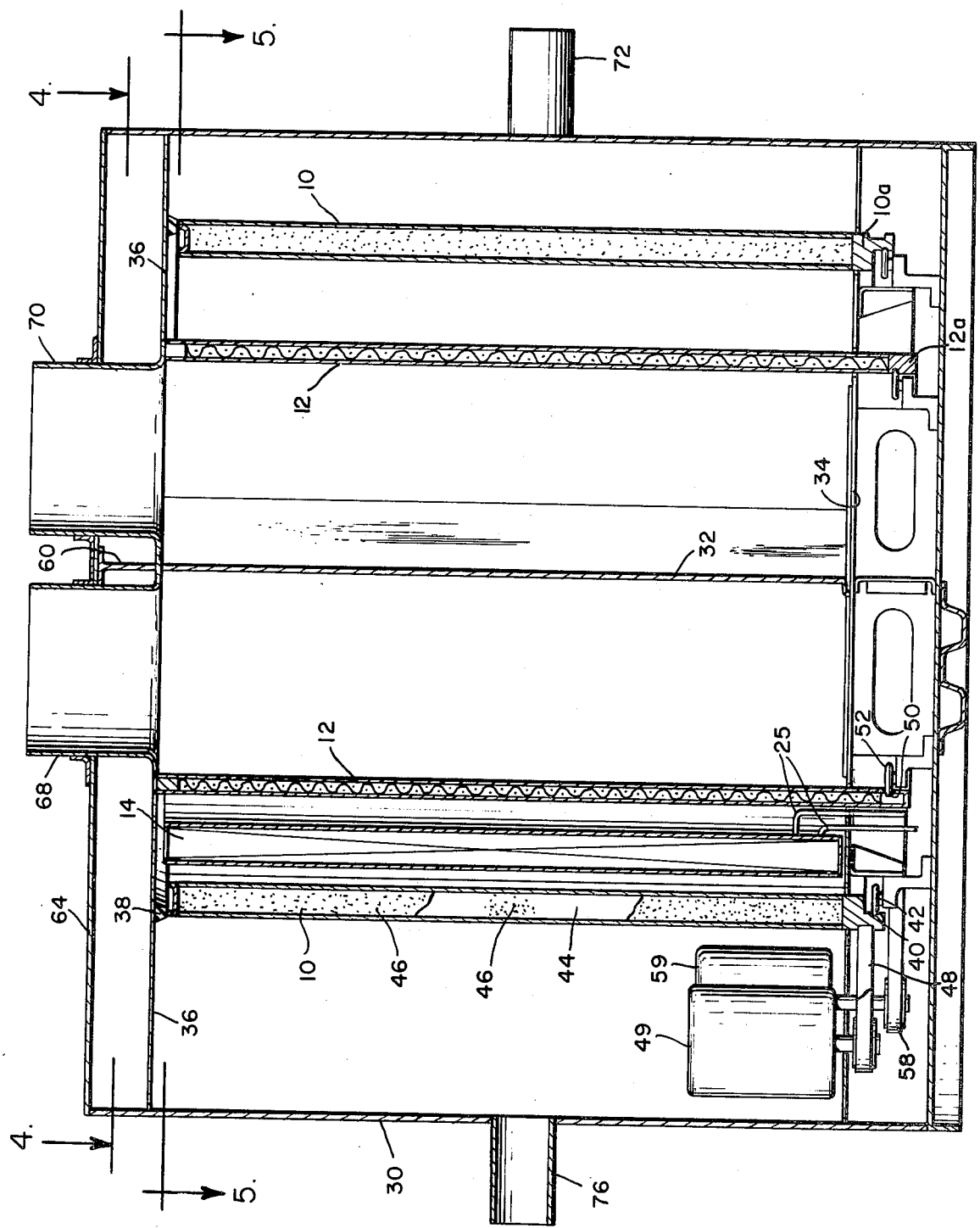
FIG. 3 is a cross-sectional view of the compact structure of FIG. 2 taken generally along the line 3—3 of FIG. 4.
Figure 4:
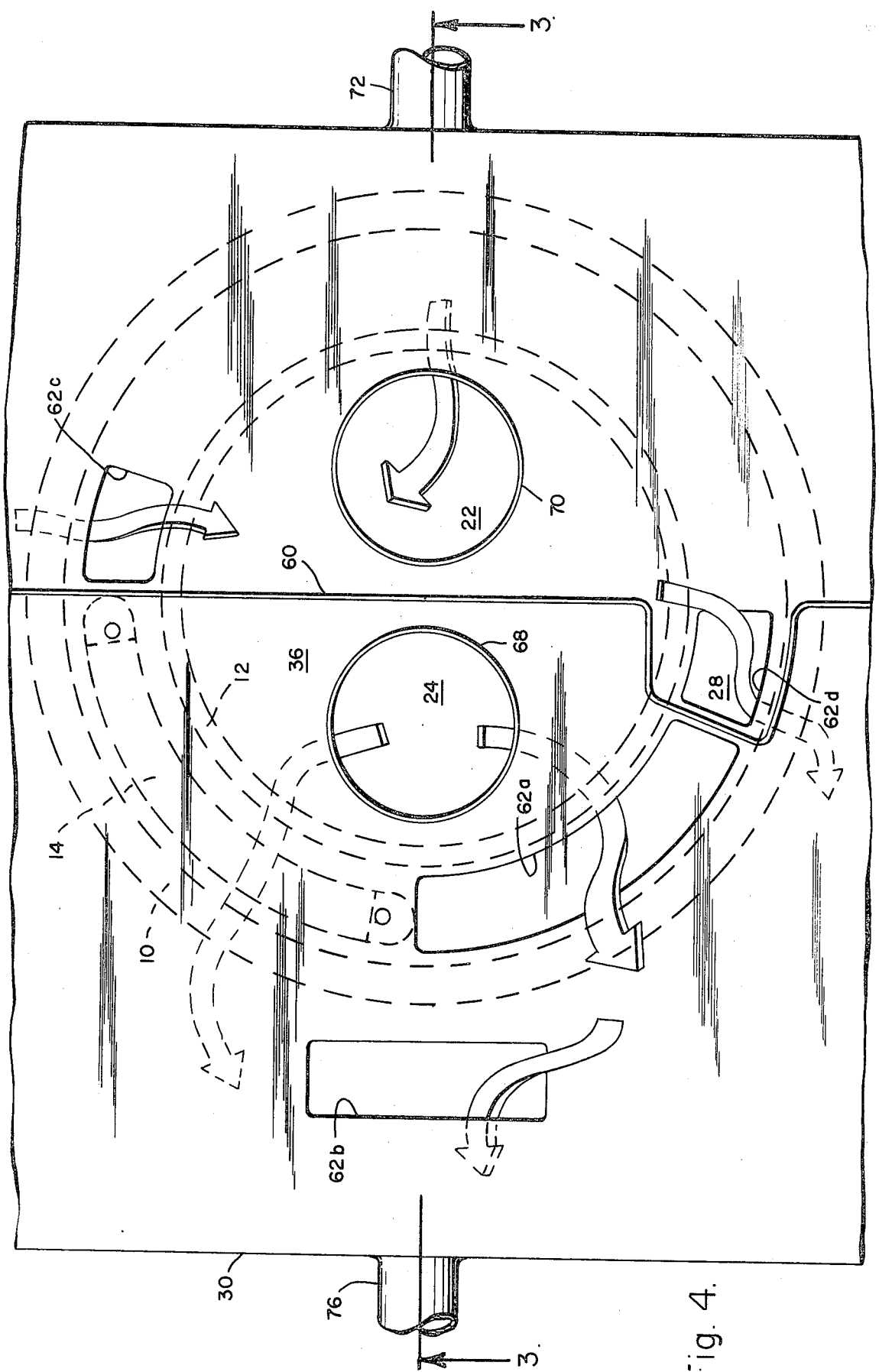
FIG. 4 is a cross-sectional view taken generally along the line 4—4 of FIG. 3.

Referring now to the drawings, an air conditioning system is illustrated in FIG. 1 utilizing a rotary desiccant bed 10 and a rotary regenerator 12 along with a solar heater 14 and humidifiers 16 and 18 for cooling a conditioned space 20 which may be a residence or other appropriate area.

Warm humid air from the conditioned space 20 is cooled for return thereto by passage along a flow path 22 through the rotary desiccant bed 10, the rotary regenerator 12, and humidifier 18. Passage of the warm humid air through the rotary desiccant bed 10 causes moisture to be removed from the air by adsorption. This process also causes an increase in temperature of the air so that heated dry air is passed from the desiccant bed 10 to the rotary regenerator 12 wherein heat is removed such that the air leaves the rotary regenerator dry but at a temperature only slightly higher than its temperature before entering the desiccant bed 10. The air is then passed through the humidifier 18 wherein the dry air vaporizes water and is thereby cooled in a well known manner. This cooled, moist air is then returned to the conditioned space 20 for cooling.

While this cooling cycle is relatively simple, it is necessary that additional means be provided for withdrawing heat from the rotary regenerator 12 and also for drying the rotary desiccant bed 10. For this purpose, a flow path 24 for circulating outside air through the system is provided.

First, outside air is passed through the humidifier 16 where it is cooled by vaporization in the same manner previously discussed with respect to the humidifier 18. This cooled, humidified air then passes through the rotary regenerator 12 to remove heat therefrom. The cooled, humidified air from the regenerator 12 flows along two separate paths 24a and 24b. Flow path 24a leads directly to ambient exhaust. Air along flow path 24b passes to the solar heater 14 wherein it is substantially increased in temperature. The solar heater 14 is connected by pipes 25 to a heat source 26 which may be a solar heating unit or an intermediate storage device. It should be noted that, if desired, a source of heat other than solar energy may be utilized in this system.

Heated air from the solar heater 14 passes through the rotary desiccant bed 10 and removes the moisture which it had adsorbed from recirculated air along the flow path 22. This process serves to cool the air which is then exhausted to ambient.

An additional flow path 28 is provided for recirculation of outside air through the rotary desiccant bed 10. As will be seen in connection with the description of FIGS. 2–5, air in this flow path serves the purpose of thermal preconditioning of the desiccant bed between the adsorbing and desorbing streams.

Construction of the system of FIG. 1 in accordance with prior art practices would require a substantial use of space to house the necessary components. However, in accordance with this invention, an improved structural module, illustrated in FIGS. 2–5, may be utilized to provide a compact structure for housing a substantial portion of the necessary components of the system.

A housing 30 is provided to contain system components and form a flow path for air to, from and through the system. Suitable dividers 32, flooring 34 and partitions 36 aid in providing appropriate flow direction and help maintain structural integrity of the unit. Appropriate seals 38 may be utilized wherever system components and structural members interact to prevent undesired cross-over air flow.

The rotary desiccant bed 10 is constructed in a generally cylindrical configuration and is mounted for rotation around its axis within housing 30. In the preferred embodiment, a lower end portion 10a (FIG. 3) extends through the flooring 34 and has a circumferential groove 40 formed on an end surface thereof so that support may be provided by a suitable number of bearings 42.

The rotary desiccant bed 10 has inner and outer surfaces which are formed of highly porous materials, such as screens or perforated plates, which will pass substantial quantities of air but has openings sufficiently small so that the desiccant materials may be held therein. A plurality of separators 44 (FIG. 5) are preferably vertically positioned generally uniformly spaced within the rotary desiccant bed 10 to form desiccant holding compartments 46 therebetween. These compartments aid in the filling and emptying of the rotary desiccant bed in that it helps assure that proper distribution of desiccant material will be maintained therein. Also, by using such construction, the rotary desiccant bed may be utilized in either a vertical or horizontal axial orientation without substantial abrasion and deterioration of the desiccant material which may occur without such compartmentalization.

The desiccant may be any material suitable for providing sufficient water adsorption in accordance with operating parameters required for the system. Such materials include granular silica gel and molecular sieve pellets. In the preferred embodiment, silica gel is utilized in the rotary desiccant bed.

While many alternate means may be used to drive the desiccant bed, in the preferred embodiment, rotation is provided by a conventional belt drive wherein a drive belt 48 is wrapped around the lower end portion 10a of the desiccant bed and connected to a suitable drive motor 49 which drives the desiccant bed at speeds suitable to optimize water removal capabilities of the system. In the preferred embodiment, the rotary desiccant bed is driven at rate five revolutions per hour.

The rotary regenerator 12 is also formed in a generally cylindrical configuration and is mounted concentrically within the desiccant bed 10, having a lesser radial dimension than the desiccant bed. The rotary regenerator 12 is constructed and mounted in a manner similar to the desiccant bed with a lower end portion 12a extending through the flooring 34 and having a groove 50 on an inner surface thereof to accommodate mounting on a suitable number of bearings 52. In the preferred embodiment, the rotary regenerator is formed with layers of screening held between porous inner and outer walls to receive and give up heat in a well known manner.

The lower end portion 12a of the rotary regenerator 12 extends beyond the lower end portion 10a of the rotary desiccant bed 10 to accommodate an engagement by a drive belt 58 which is connected to a suitable motor 59 for causing rotation of the rotary regenerator 12. Alternatively, the drive belt 58 may be connected through gearing to the same motor to which the drive belt 48 is connected. Separate motors would, however, be preferable because, in the preferred embodiment, the rotary regenerator is rotated at a rate of about 20 revolutions per minute so that the turns ratio of the rotary regenerator and rotary desiccant bed would be about 240 to 1.

The solar heater 14 is positioned between the rotary desiccant bed 10 and the rotary regenerator 12 and positioned to be only within the flow path 24b. The solar heater 14 is preferably a cross-flow, liquid-air heat exchanger. Pipes 25 extend through the flooring 34 for connection to the heat source 26.

Partition 60 (FIG. 4) interacts with dividers 32 and openings 62 in partition 36 to form flow path 28 as well as completing flow paths 24.

A cover 64 (FIG. 3) is positioned on the top of the housing 30. Flow ducts 68 and 70 also extend through aligned openings in the cover 64 and partition 36 to communicate with the regenerator 12 on opposite sides of the central divider 32. Additional flow paths to and from the housing 30 (FIG. 2) are provided by ducts 72, 74 and 76.

As can be seen, the housing 30 contains substantially all of the structure of the air conditioning system of FIG. 1 with the exception of pumps and blowers, where necessary, and the humidifiers 16 and 18 which will be positioned within close proximity thereto and connected by suitable ducting.

Figure 5:
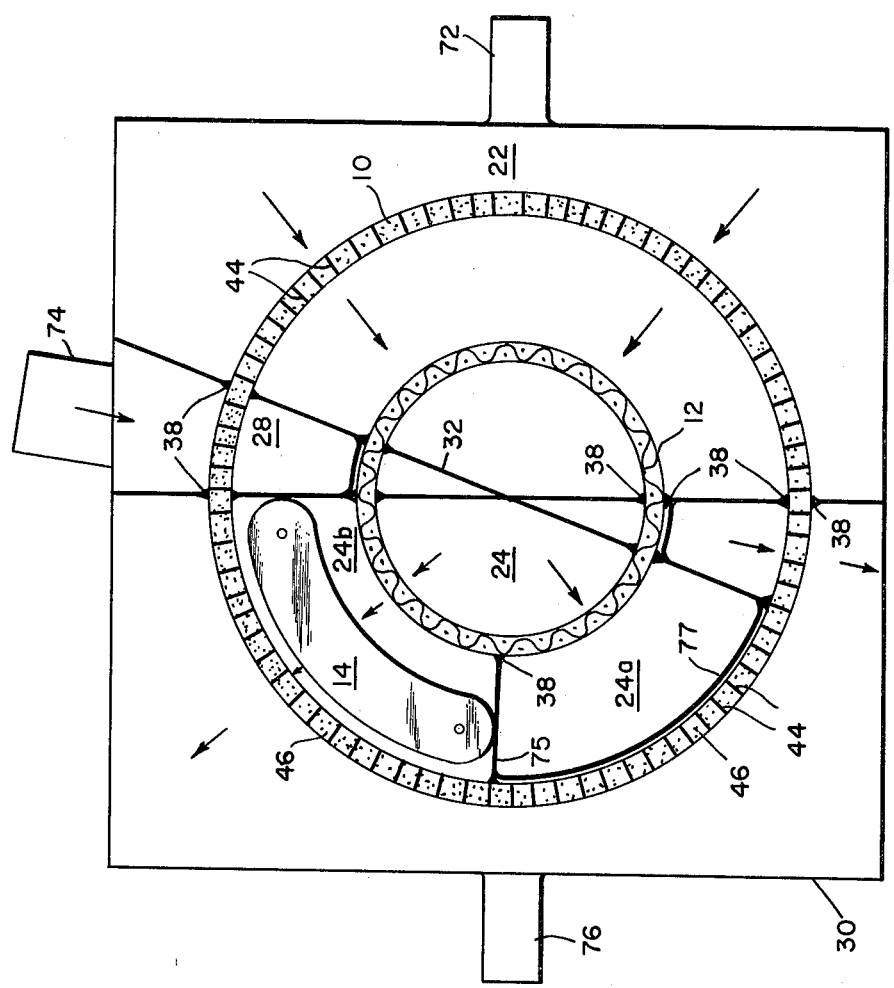
FIG. 5 is a cross-sectional view taken along the line 5—5 of FIG. 3.

During operation of the system, return air from the conditioned space 20 travels along the path 22 entering the housing 30 through duct 72. This air may, for example, be at a dry bulb temperature of about 78° F. and a wet bulb temperature of about 67° F. corresponding to a humidity ratio of 0.00117 lb. moisture/lb. dry air. The air flows through the rotary desiccant bed 10 which is rotating in a clockwise direction as seen in FIG. 5. This lowers the humidity ratio to about 0.0065 lb. moisture/lb. dry air and increases the temperature of air to about 115° F. The air then flows through the rotary regenerator 12 wherein the temperature is decreased to about 81° F. This dry air then exits the housing 30 through the duct 70 and travels to the humidifier 18 where its temperature decreases to about 62° F. while its humidity ratio is increased to about 0.0107 lb. moisture 1 lb dry air for cooling the conditioned space.

Humidified outside air at a dry bulb temperature of about 77° F. and wet bulb temperature of about 75° F. is received from the humidifier 16 along flow path 24 through the duct 68, entering the housing 30 for passage through the rotary regenerator 12. This air removes heat from the rotary regenerator such that the air is heated to a temperature of about 111° F. The air then splits into two portions, separated by a divider 75 (FIG. 5). One portion, corresponding to flow path 24a, passes through opening 62a in partition 36, being blocked against flow through the desiccant bed 12 by a barrier 77. This air then exits to ambient through an opening 62b in partition 36 and the duct 76. The function of the air in flow path 24a is to cool the rotary regenerator 12 without affecting the desiccant bed 10. This is due to the high humidity of this air which would be more detrimental to the desiccant bed than helpful. By using the barrier 77, a smaller solar heater 14 may be used to optimize performance with improved component economy.

The other portion of this air, corresponding to flow path 24b, flows through the solar heater 14 where it is further heated to a temperature of about 180° F. and then passes through rotary desiccant bed 10. This greatly heated air serves to remove the moisture which has been adsorbed by the desiccant bed in flow path 22. The air is then exhausted to ambient through duct 76 at a temperature of about 120° F. and a humidity ratio of about 0.028 lb. moisture/lb. dry air.

Air in the flow path 28 enters the housing 30 through duct 74 and flows through the desiccant bed 10. This cools the desiccant bed before it enters flow path 22. The air then flows through an opening 62c in partition 36, staying on one side of partition 60 until flowing through opening 62d and back through the desiccant bed 10. This preheats the desiccant bed before it enters flow path 24. The air next mixes with the other exhaust streams, exiting to ambient through duct 76.

Figure 6:
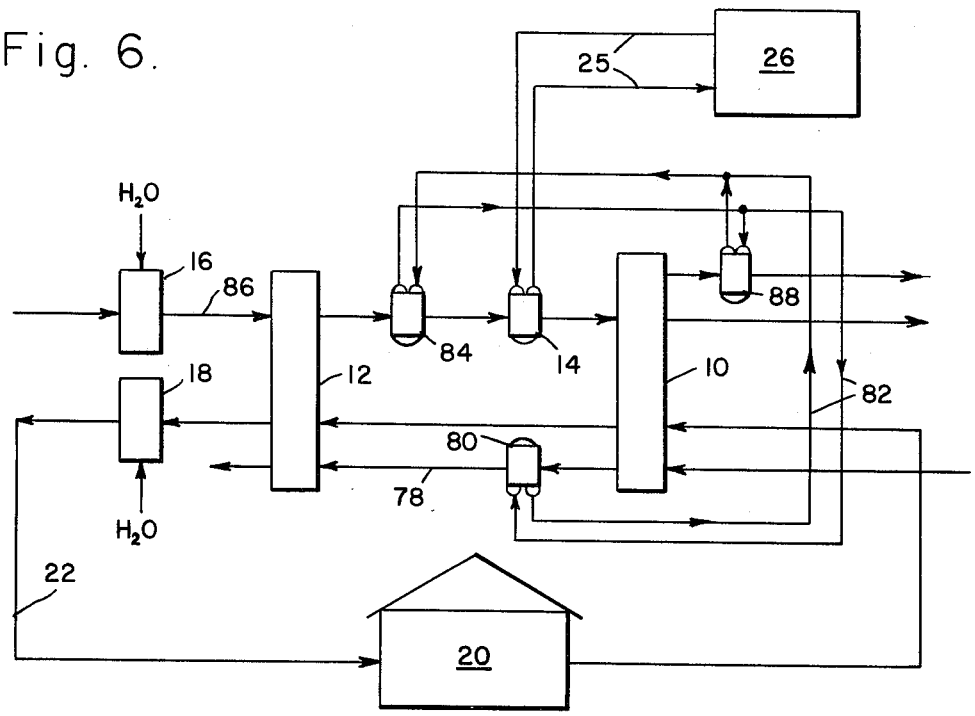
FIG. 6 is a schematic diagram of an alternate air conditioning system incorporating the present invention.
Figure 7:
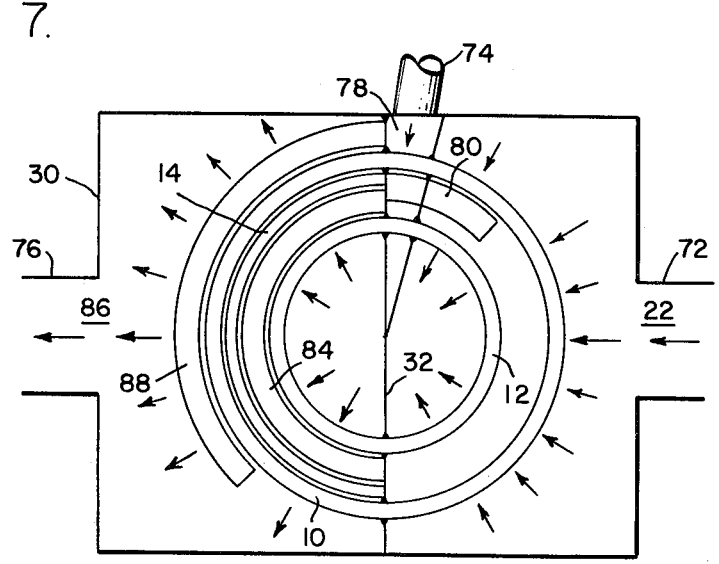
FIG. 7 is a cross-sectional view similar to FIG. 5 of a compact structure incorporating components for the air conditioning system of FIG. 6.

FIG. 6 illustrates a modification of the air conditioning system of FIG. 1 and illustrates how this more complex system can still be incorporated within the housing 30 in a manner illustrated in FIG. 7. In the description of this embodiment, the numbering of similar components will be retained.

In this embodiment, flow path 22 remains the same with return air from the conditioned space 20 flowing through the rotary desiccant bed 10, rotary regenerator 12 and humidifier 18 to be cooled for return to the conditioned space 20.

The other flow paths are, however, significantly changed. A flow path 78 carries outside air through the duct 74 into the housing 30 where it passes through rotary desiccant bed 10, a recuperator 80 and the rotary regenerator 12 to be exhausted through the cover (not shown) to ambient. The ambient air flowing through the desiccant bed 10 serves to purge and cool the desiccant bed prior to entry into the flow path 22. The recovered heat is removed by the recuperator 80 and transferred by pipes 82 to a pre-heater 84 which will be subsequently described herein.

The cooling of the rotary regenerator 12 and drying of the rotary desiccant bed 10 is now performed by outside air flowing along a flow path 86 through the humidifier 16 and the rotary regenerator 12 to the pre-heater 84. The pre-heater is used to minimize the quantity of solar thermal energy necessary to regenerate the silica gel dryer. The pre-heater receives its thermal energy from the recuperator 80 and a recuperator 88 in the hot portion of the air stream from the rotary desiccant bed. Instead of exhausting this heat to ambient, it is recovered and used to begin heating of the air for drying the desiccant bed.

After passing through the pre-heater 84, the air flows through the solar heater 14 where it is heated for removal of moisture in the rotary desiccant bed 10.

After the air has passed through the rotary desiccant bed, it splits into two portions. The air passing through the regenerator at a point where it first begins to be heated (this air will be relatively cool) passes directly to ambient through the duct 76. That portion of air passing through the desiccant bed after it has been heated, such that the air passing therethrough will be sufficiently hot, passes through the recuperator 88 for transfer of this heat to the pre-heater 84 before the air is exhausted to ambient through the duct 76.

As can be seen through examination of FIGS. 6 and 7, this more highly complex system may be placed in a package of similar size to the system of FIGS. 1-5 with substantially all components but the humidifiers being contained within the package. Accordingly, an air conditioning system package is provided which may house wide varieties of either simple or complex air conditioning structures in a configuration which may be contained in a small space, provides efficient positioning of components, and lends itself to great varieties of system design.

I claim:

1. An air conditioning system for providing temperature controlled air to a conditioned space, said system comprising:
   a desiccant bed having a generally cylindrical configuration and a first radial dimension;
   regenerator means having a substantially cylindrical configuration and second radial dimension different from said first radial dimension;
   means for mounting said desiccant bed and said regenerator means in a generally concentric orientation;
   means for directing a first air flow through said desiccant bed and said regenerator means for controlling said conditioned space temperature;
   means for directing a second air flow through said regenerator means and said desiccant bed for desorbing said desiccant bed; and
   means for substantially isolating said first and second air flows.

2. The air conditioning system of claim 1 including means for producing relative rotation of said desiccant bed and said regenerator means.

3. The air conditioning system of claim 2 wherein said rotation producing means comprises first drive means for producing rotation of said desiccant bed in one direction and second drive means for producing rotation of said regenerator means in an other direction.

4. The air conditioning system of claim 1 wherein said first radial dimension is greater than said second radial dimension.

5. The air conditioning system of claim 1 including heater means mounted between said regenerator means and said desiccant bed for heating at least a portion of said second air flow.

6. The air conditioning system of claim 5 wherein said heater means comprises a solar heater.

7. The air conditioning system of claim 1 wherein said first and second air flow directing means comprises:
   housing means for containing said desiccant bed and said regenerator means;
   partition means for dividing said housing into a first section and a second section;
   means for directing said first air flow into said first housing section adjacent said desiccant bed;
   means for removing said first air flow from said first housing section adjacent said regenerator means;
   means for directing said second air flow into said second housing section adjacent said regenerator means; and
   means for removing said second air flow from said second housing section adjacent said desiccant bed.

8. The air conditioning system of claim 7 including:
   humidifier means; and
   means interposing said humidifier means in said first air flow between said first air flow removing means and said conditioned space.

9. The air conditioning system of claim 8 including:
   additional humidifier means; and
   means for connecting said additional humidifier means to said second air flow directing means.

10. The air conditioning system of claim 9 including means for feeding outside air to said additional humidifier means.

11. The air conditioning system of claim 7 including means for rotating said desiccant bed and said regenerator means through said first housing section and said second housing section.

12. The air conditioning system of claim 11 wherein said rotating means comprises:
- first drive means for rotating said desiccant bed in one direction; and
- second drive means for rotating said regenerator means in an other direction opposite said one direction.

13. The air conditioning system of claim 11 including
- means for defining a third housing section between said first housing section and said second housing section on one side of an axis of said desiccant bed;
- means for defining a fourth housing section between said first housing section and said second housing section on an other side of said axis opposite said one side; and
- means for directing a third air flow through said desiccant bed in each of said third housing section and said fourth housing section.

14. The air conditioning system of claim 13 wherein said third air flow directing means includes:
- partition means disposed in said housing generally perpendicular to said axis defining a fifth housing section;
- means for preventing air flow through said regenerator means from said third housing section and said fourth housing section;
- a first opening in said partition means communicating between said third housing section and said fifth housing section; and
- a second opening in said partition means communicating between said fifth housing section and said fourth housing section.

15. The air conditioning system of claim 11 wherein said first radial dimension is greater than said second radial dimension and including:
- heater means mounted between said regenerator means and said desiccant bed in said second housing section;
- recuperator means having first, second, and third interconnected portions;
- means for mounting said first recuperator portion in said first housing section between said desiccant bed and said regenerator means;
- means for mounting said second recuperator portion in said second housing section between said regenerator means and said heater means; and
- means for mounting said third recuperator portion in said second housing section outside said desiccant bed.

16. In an air conditioning system wherein air flows along a first path through a desiccant bed, regenerator means, and humidifier means for cooling a conditioned space, and air flows along a second path through humidifier means, said regenerator means, heater means, and said desiccant bed for desorbing said desiccant bed, the improvement comprising:
- a housing;
- a generally cylindrical desiccant bed having an axis and mounted in said housing for rotation around its axis;
- a generally cyclindrical regenerator means having an axis and mounted in said housing for rotation around its axis; and
- partition means for dividing said housing into a first housing section containing a portion of each of said desiccant bed and said regenerator means for receiving air along said first flow path, and a second housing section containing a portion of said desiccant bed and said regenerator means for receiving air along said second flow path.

17. The air conditioning system of claim 16 including drive means for rotating said desiccant bed in one direction and rotating said regenerator means in an other direction.

18. The air conditioning system of claim 17 wherein said drive means comprises:
- first drive motor for rotating said desiccant bed; and
- second drive motor for rotating said regenerator means.

19. The air conditioning system of claim 18 including drive belts for respectively connecting said first and second drive motors to said desiccant bed and regenerator means.

20. The air conditioning system of claim 16 including solar heater means mounted in said second housing section between said regenerator means and said desiccant bed.

21. A method of cooling a conditioned space with an air conditioning system including a desiccant bed and regenerator means;
said method comprising the steps of:
- configuring said desiccant bed in a generally cylindrical arrangement;
- configuring said regenerator means in a generally cylindrical arrangement;
- mounting said desiccant bed and regenerator means coaxially within a housing;
- dividing said housing into first and second sections, each containing a portion of said desiccant bed and said regenerator means;
- mounting heater means between said regenerator means and desiccant bed in said second housing section;
- producing relative rotation of said desiccant bed and regenerator means around their axis through said first housing section and said second housing section;
- circulating air from a conditioned space through the portion of said desiccant bed and the portion of said regenerator means in said first housing section and through a humidifier means; and
- flowing air through a humidifier means and through the portion of said regenerator means, said heater means, and the portion of said desiccant bed in said second housing section.

22. A module for an air conditioning system, said module comprising:
- a desiccant bed having a generally cylindrical configuration and a first radial dimension;
- regenerator means having a substantially cylindrical configuration and a second radial diemension different from said first radial dimension;
- means for mounting said desiccant bed and said regenerator means in a generally concentric orientation;
- means for directing a first air flow through said desiccant bed and said regenerator means for controlling the temperature of said conditioned space;
- means for directing a second air flow through said regenerator means and said desiccant bed for desorbing said desiccant bed; and
- means for substantially isolating said first and second air flows.

23. The air conditioning system of claim 22 including means for producing relative rotation of said desiccant bed and said regenerator means.

24. The air conditioning system of claim 23 wherein said rotation producing means comprises first drive means for producing rotation of said desiccant bed in one direction and second drive means for producing rotation of said regenerator means in an other direction.

25. The air conditioning system of claim 22 including heater means mounted between said regenerator means and said desiccant bed for heating at least a portion of said second air flow.

26. The air conditioning system of claim 25 wherein said heater means comprises a solar heater.

27. The air conditioning system of claim 22 wherein said first and second air flow directing means comprises:
  housing means for containing said desiccant bed and said regenerator means;
  partition means for dividing said housing into a first section and a second section;
  means for directing said first flow into said first housing section adjacent said desiccant bed;
  means for removing said first air flow from said first housing section adjacent said regenerator means;
  means for directing said second air flow into said second housing section adjacent said regenerator means; and
  means for removing said second air flow from said second housing section adjacent said desiccant bed.

28. The air conditioning system of claim 27 including means for rotating said desiccant bed and said regenerator means through said first housing section and said second housing section.

29. The air conditioning system of claim 28 wherein said rotating means comprises:
  first drive means for rotating said desiccant bed in one direction; and
  second drive means for rotating said regenerator means in an other direction opposite said one direction.

30. The air conditioning system of claim 28 including:
  means for defining a third housing section between said first housing section and said second housing section on one side of an axis of said desiccant bed;
  means for defining a fourth housing section between said first housing section and said second housing section on an other side of said axis opposite said one side; and
  means for directing a third air flow through said desiccant bed in each of said third housing section and said fourth housing section.

31. The air conditioning system of claim 30 wherein said third air flow directing means includes:
  partition means disposed in said housing generally perpendicular to said axis defining a fifth housing section;
  means for preventing air flow through said regenerator means from said third housing section and said fourth housing section;
  a first opening in said partition means communicating between said third housing section and said fifth housing section; and
  a second opening in said partition means communicating between said fifth housing section and said fourth housing section.

32. The air conditioning system of claim 28 wherein said first radial dimension is greater than said second radial dimension and including:
  heater means mounted between said regenerator means and said desiccant bed in said second housing section;
  recuperator means having first, second, and third interconnected portions;
  means for mounting said first recuperator portion in said first housing section between said desiccant bed and said regenerator means;
  means for mounting said second recuperator portion in said second housing section between said regenerator means and said heater means; and
  means for mounting said third recuperator portion in said second housing section outside said desiccant bed.

33. An air conditioning system for providing a temperature control to a conditioned space, said system comprising:
  a housing;
  a generally cylindrical desiccant bed having an axis and mounted in said housing for rotation around its axis;
  a generally cylindrical regenerator means having an axis and mounted in said housing within said desiccant bed for rotation around its axis;
  partition means for dividing said housing into a first housing section containing a portion of said desiccant bed and said regenerator means, and a second housing section containing a portion of said desiccant bed and said regenerator means;
  first drive motor and drive belt coupled to said desiccant bed for rotating said desiccant bed in one direction;
  second drive motor and drive belt coupled to said regenerator means for causing rotation of said regenerator means in an other direction;
  solar heater means mounted between said regenerator means and said desiccant bed in said second housing section;
  first and second humidifier means;
  means for circulating air from said conditioned space through the portion of said desiccant bed and the portion of said regenerator means in said first housing section and through said first humidifier means for return to said conditioned space; and
  means for directing air through said second humidifier means, through the portion of the regenerator means, said solar heater, and the portion of said desiccant bed in said second housing section for regenerating said desiccant bed.

34. The air conditioning system in claim 33 including means for directing a portion of air from said second humidifier means through said regenerator means, bypassing said solar heater and said desiccant bed.

35. The air conditioning system of claim 34 including:
  means for defining a third housing section between said first housing section and said second housing section on one side of said axis;
  means for defining a fourth housing section between said first housing section and said second housing section on an other side of said axis opposite said one side;
  means for directing a third air flow through said desiccant bed in each of said third housing section and fourth housing section;
  partition means disposed in said housing generally perpendicular to said axis defining a fifth housing section;
  means for preventing air flow through said regenerator means from said third housing section and said fourth housing section;

a first opening in said partition means communicating between said third housing section and said fifth housing section; and a second opening in said partition means communicating between said fifth housing section and said fourth housing section.

36. The air conditioning system of claim 33 including:

recuperator means having first, second, and third interconnected portions;

means for mounting said first recuperator portion in said first housing section between said desiccant bed and said regenerator means;

means for mounting said second recuperator portion in said second housing section between said regenerator means and said solar heater; and means for mounting said third recuperator portion in said second housing section outside said desiccant bed.

* * * * *